(12) United States Patent
Sykes

(10) Patent No.: US 7,743,892 B2
(45) Date of Patent: Jun. 29, 2010

(54) DEVICE AND METHOD FOR PRE-STRESSING THE CABLE SYSTEM OF A VEHICLE BRAKE ACTUATING SYSTEM

(75) Inventor: Michael Sykes, Orangeville (CA)

(73) Assignee: Ventra Group, Inc., Ontario (CA)

( * ) Notice: Subject to any disclaimer, the term of this patent is extended or adjusted under 35 U.S.C. 154(b) by 1204 days.

(21) Appl. No.: 11/331,283

(22) Filed: Jan. 13, 2006

(65) Prior Publication Data

US 2007/0175289 A1      Aug. 2, 2007

(51) Int. Cl.
*F16H 1/00* (2006.01)
(52) U.S. Cl. ...................................... 188/2 D
(58) Field of Classification Search ............... 188/2 D, 188/265, 106 P, 156
See application file for complete search history.

(56) References Cited

U.S. PATENT DOCUMENTS

| | | | |
|---|---|---|---|
| 2,399,793 A | 5/1946 | Cushman | |
| 2,912,072 A | 11/1959 | Jones | |
| 4,889,007 A | 12/1989 | Senft et al. | |
| 5,309,786 A | 5/1994 | Paré et al. | |
| 5,528,957 A | 6/1996 | Belmond et al. | |
| 5,590,744 A | 1/1997 | Belmond | |
| 5,813,290 A | 9/1998 | Takahashi et al. | |
| 5,983,745 A | 11/1999 | Petrak | |
| 6,244,129 B1 | 6/2001 | Krug et al. | |
| 6,477,915 B1 | 11/2002 | Etxebarrena Allende | |
| 7,464,608 B2 * | 12/2008 | Revelis et al. ................. | 73/826 |
| 2002/0011129 A1 | 1/2002 | Petrak | |
| 2002/0070083 A1* | 6/2002 | Farenden .................... | 188/2 D |
| 2003/0075000 A1 | 4/2003 | Grundke | |
| 2003/0227010 A1 | 12/2003 | Petrak | |

* cited by examiner

*Primary Examiner*—Bradley T King
(74) *Attorney, Agent, or Firm*—Pillsbury Winthrop Shaw Pittman LLP

(57) ABSTRACT

The present invention relates to a device and method for pre-stressing the cable system of a vehicle brake actuating system.

30 Claims, 3 Drawing Sheets

DEVICE AND METHOD FOR PRE-STRESSING THE CABLE SYSTEM OF A VEHICLE BRAKE ACTUATING SYSTEM

FIELD OF THE INVENTION

The present invention relates to a device and method for pre-stressing the cable system of a vehicle brake actuating system.

BACKGROUND OF THE INVENTION

After installing a brake system in a motor vehicle, it is often desirable to "pre-stress" the cables of the brake system to reduce the development of slack in the cables from load setting that may occur during the early life of the vehicle. For example, in a brake system that has not been pre-stressed and uses cables that are guided by flexible conduits extending between the actuator and the brakes, when the brakes are first applied, the tension in the cables tends to cause some straightening at their bends, which will in turn cause compression of the conduits. Compression of the conduits in turn leads to the cables developing an "apparent stretch." This term describes the condition of the cable behaving as if it had become longer, when in fact its guide conduit has become shorter. In systems with no slack take-up mechanism, this presents the problem of losing cable tension relatively early in the vehicle's life. Even in systems with a slack take-up device, it is undesirable to have to waste the slack take-up capability on this development of apparent stretch and would be beneficial to preserve the slack take-up capability for taking up slack due to actual cable stretch that can occur over a much longer period of time.

One way to deal with this issue is to repeatedly operate the actuator to increase and decrease the tension in the cables prior to shipping the vehicle, thereby compressing the cable conduits. This pre-stressing reduces the development of subsequent compression of the cable conduits and the accompanying development of apparent cable stretch. However, for manually operated brake actuators, it is labor intensive to have a person repeatedly operate the actuator a sufficient number of times to effectively pre-stress the brake system (usually 10 or more times is desirable). Also, this type of work can lead to repetitive motion disorders for the worker assigned to this task. There are automated machines for this purpose, but they are expensive, and must be maneuvered carefully into the vehicle cockpit to avoid damaging any finished surfaces.

U.S. Patent Application Publication No. 2003/0227010 A1 discloses one approach to pre-stressing the system. However, this approach is unsatisfactory because it requires a specialized tool that may not interface well with some vehicle designs.

Another approach to pre-stressing the system is disclosed in U.S. Pat. No. 5,983,745 and U.S. Patent Application Publication No. 2002/011129A1. This approach works by using a shear tab in its cable connector. The shear tab is positioned so that as the actuator is operated, the tension applied to the cables is much higher than would normally be experienced, and ultimately the shear tab breaks. Then the cable tension is relaxed to a normal operational range. This approach is a "one-shot" approach, as the shear tab breaks on the first operation of the actuator, and relies on using an extra high amount of cable tension. This approach suffers the drawback that it does not replicate the repeated, cyclical type of operation that a brake system experiences during usage.

SUMMARY OF THE INVENTION

One aspect of the invention provides a brake actuating system in a motor vehicle having wheels and brakes for braking rotation of the wheels wherein the brake actuating system has an improved device for pre-stressing the brake cables. The brake actuating system of this aspect of the invention comprises a cable system, an actuator operatively connected to the cable system, and a cable tensioner mounted in the cable system. The cable system includes a plurality of cables operatively connected to the brakes of the vehicle such that increasing tension in the cables activates the brakes, and then decreasing the tension in the cables deactivates the brakes. The actuator is operable by a vehicle driver to selectively increase and decrease the tension in the cables of the cable system to thereby activate and deactivate the brakes of the vehicle, respectively. The cable tensioner has an input connector and an output connector. The cable system includes at least one input side cable operatively connecting the input connector to the actuator and at least one output side cable operatively connecting the output connector to the brakes of the vehicle.

The input and output connectors are movable relative to one another in (1) a tensioning direction to increase the tension in the cable system, and (2) a releasing direction to decrease the tension in the cable system. The cable tensioner also comprises a rotary input member constructed to be rotatably driven by a torque applying device. The rotary input member is operatively connected to the input and output connectors such that rotating the rotary input member moves the input and output connectors in an alternating manner in the tensioning and releasing directions to cyclically increase and decrease the tension in the cable system.

Another aspect of the invention provides a method for pre-stressing a cable system of a brake system of a brake actuating system in a motor vehicle having wheels and brakes for braking rotation of the wheels. The cable system includes a plurality of cables operatively connected to the brakes of the vehicle such that increasing tension in the cables activates the brakes and decreasing the tension in the cables deactivates the brakes. The brake system further comprises an actuator operatively connected to the cable system. The actuator is operable by a vehicle driver to selectively increase and decrease the tension in the cables of the cable system to thereby activate and deactivate the brakes of the vehicle, respectively. A cable tensioner is mounted in the cable system and has an input connector, an output connector and a rotary input member. The cable system includes at least one input side cable operatively connecting the input connector to the actuator and at least one output side cable operatively connecting the output connector to the brakes of the vehicle. The input and output connectors are movable relative to one another in (a) a tensioning direction to increase the tension in the cable system, and (b) a releasing direction to decrease the tension in the cable system. The rotary input member is operatively connected to the input and output connectors such that rotating the rotary input member moves the input and output connectors in an alternating manner in the tensioning and releasing directions. The method of this aspect of the invention comprises rotating the rotary input member with a torque applying device to move the input and output connectors of the cable tensioner in an alternating manner in the tensioning and releasing directions to cyclically increase and decrease the tension in the cable system.

Yet another aspect of the invention provides a cable tensioner for use in a brake actuating system in a motor vehicle having wheels and brakes for braking rotation of the wheels. The brake actuating system comprises a cable system, and an actuator operatively connected to the cable system. The cable system includes a plurality of cables operatively connected to the brakes of the vehicle such that increasing tension in the cables activates the brakes and decreasing the tension in the cables deactivates the brakes. The actuator is operable by a vehicle driver to selectively increase and decrease the tension in the cables of the cable system to thereby activate and deactivate the brakes of the vehicle, respectively. The cable system includes at least one input side cable operatively connected to the actuator and at least one output side cable operatively connected to brakes of the vehicle. The cable tensioner of this aspect of the invention comprises an input connector constructed to be operatively connected to the at least one input side cable of the cable system, and an output connector constructed to be operatively connected to the at least one output side cable of the cable system.

The input and output connectors are movable relative to one another in (1) a tensioning direction to increase the tension in the cable system when the input and output connectors are operatively connected to the at least one input side cable and the at least one output side cable of the cable system, and (2) a releasing direction to decrease the tension in the cable system when the input and output connectors are operatively connected to the at least one input side cable and the at least one output side cable of the cable system. The tensioner further comprises a rotary input member constructed to be rotatably driven by a torque applying device. The rotary input member is operatively connected to the input and output connectors such that, when the input and output connectors are operatively connected to the at least one input side cable and the at least one output side cable of the cable system, rotating the rotary input member moves the input and output connectors in an alternating manner in the tensioning and releasing directions to cyclically increase and decrease the tension in the cable system.

Other objects, features, and advantages of the present invention will become apparent from the following detailed description, the accompanying drawings, and the appended claims.

DETAILED DESCRIPTION OF THE ILLUSTRATED EMBODIMENT OF THE INVENTION

Figure 1:
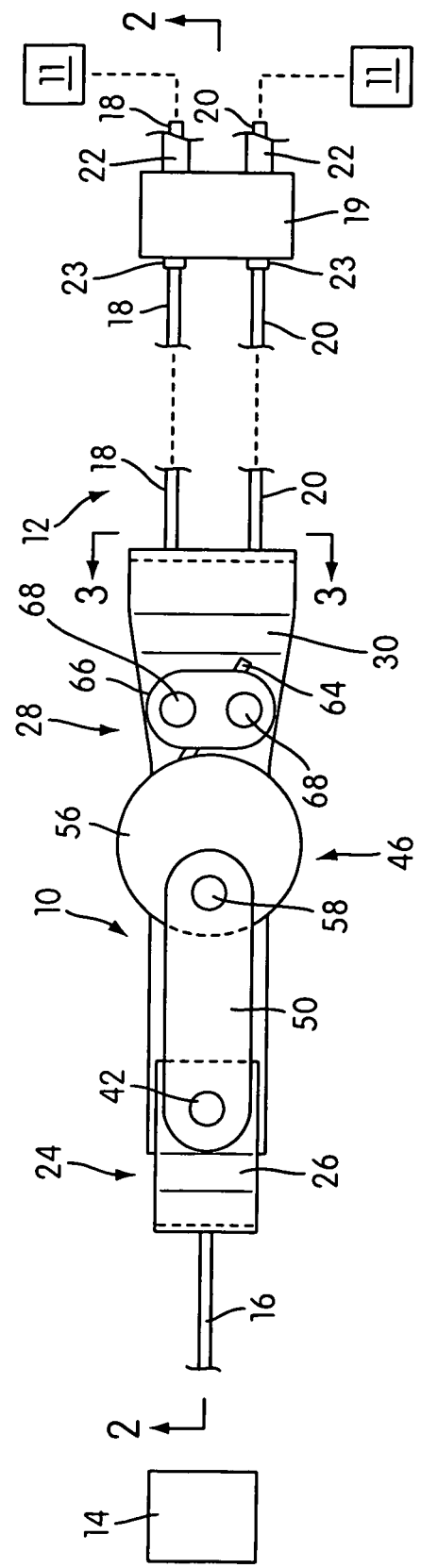
FIG. 1 is a bottom view of a vehicle braking system including a tension adjuster.

The figures illustrate a cable tensioner, generally indicated at 10, constructed to be installed and used in a brake actuating system in a motor vehicle, such as a car or truck, having wheels and brakes for braking rotation of the wheels. The brake actuating system illustrated is of the type typically referred to as a parking or emergency brake system. The brakes are shown schematically at 11. The brake actuating system of such a vehicle generally comprises a cable system, generally indicated at 12; an actuator, shown schematically at 14 and operatively connected to the cable system 12; and the cable tensioner 10.

The cable system 12 includes a plurality of cables 16, 18, 20 operatively connected to the brakes of the vehicle such that increasing tension in the cables activates the brakes and then decreasing the tension in the cables deactivates the brakes. As will be discussed below, cable 16 is an input side cable operatively connected to the actuator 14 in any suitable manner, and cables 18 and 20 are output side cables that are operatively connected to the vehicle brakes in any suitable manner. Preferably, these cables are nylon-coated steel strands. Generally, the cable system 12 may have any suitable construction or layout and the illustrated embodiment is not intended to be limiting in any way. The cables each have enlarged heads 21 at their ends for attaching them as described below.

For most systems, at least the output side cables 18, 20 will move within a pair of conduits 22 to transfer motion from one device to another. These cable/conduit constructions are commonly referred to as Bowden cables and are well known in the art as suitable devices for transferring motion between devices that are spaced from one another. Also, the flexibility of such cable/conduit constructions allows them to be routed in curved paths, which is especially useful in a vehicle where many components are arranged compactly together, and the cable/conduits constructions can be routed around these various components as needed.

In the illustrated embodiment, the output side cables 18, 20 extend from the tensioner 10 and through a pair of fittings 23 that are mounted in apertures formed in a bracket 19 fixed to the vehicle. The proximal ends of the conduits 22 have end caps 25 that abut the fittings 23, and the cables 18, 20 extend into and through the conduits 22. At the distal ends of the conduits 22 and cables 18, 20, any suitable construction may be used to establish the connection between the brakes 11 and the cables 18, 20. By fixing the opposing ends and routing the conduits in curved paths within the vehicle, the cables 18, 20 can move therein to transmit motion from the tensioner 30 to the bracket 11; but it is this arrangement that leads to the conduit compression discussed above. The input side cable 16 may be routed through a similar conduit, but that is an option and is not illustrated.

The actuator 14 may be of any construction and is operable by a vehicle driver to selectively increase and decrease the tension in the cables of the cable system to thereby activate and deactivate the brakes of the vehicle, respectively. For example, the actuator 14 may be foot-operated pedal assembly mounted beneath the dashboard of the vehicle, it may be a hand-operated pull lever mounted adjacent the driver's seat of the vehicle, or it may be a powered actuator that uses mechanical or electrical power from the vehicle for operation. Such devices are well-known in the art and need not be described herein, and any suitable actuator 14 may be used in practicing the invention.

The cable tensioner 10 may have any suitable construction. In the illustrated embodiment, it comprises a first part 24 carrying an input connector 26 (e.g., in the form of a clevis) and a second part 28 carrying an output connector 30 (e.g., also in the form of a clevis). Generally, the cable system 12 includes at least one input side cable 16 operatively connecting the input connector 26 to the actuator and at least one output side cable 18, 20 operatively connecting the output connector 30 to the brakes 11 of the vehicle. However, any number of input side or output side cables may be used and the configuration of the input and output connectors 28, 30 may be adapted to accommodate connection to the appropriate number of cables. In the illustrated embodiment, the input connector 26 is a single input connector and the at least one input side cable is a single input side cable 16; and the output connector 30 is a single output connector and the at least one output side cable is a pair of output side cables 18, 20 each operatively connected to the output connector 30.

Figure 2:
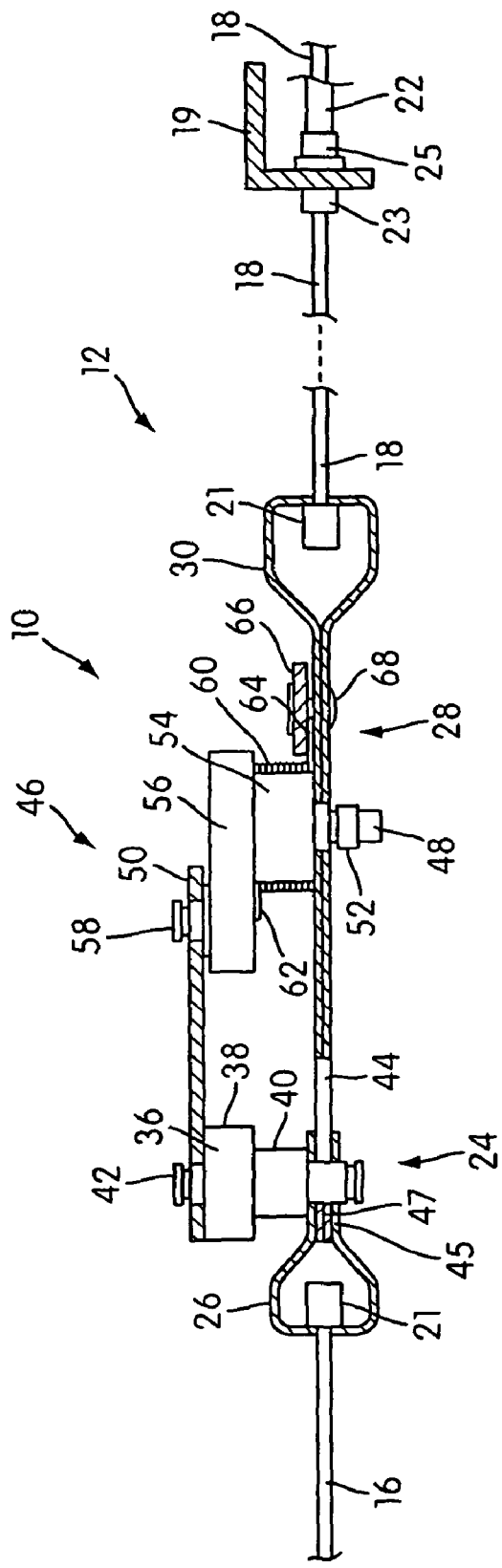
FIG. 2 is a cross-sectional view taken along line 2-2 in FIG. 1.
Figure 3:
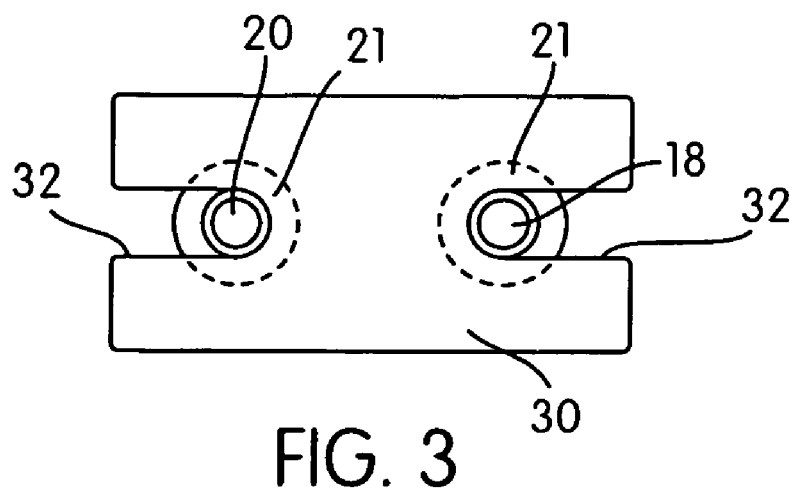
FIG. 3 is a cross-sectional view taken along line 3-3 in FIG. 1, showing how the output cables connect to the output connector.

In the illustrated embodiment, the output connector 30 is formed from a stamped piece of sheet metal that is folded over into a shape that can be appreciated from FIGS. 2 and 3. This output connector 30 has an end wall with a pair of slots 32. The cables 18, 20 are received laterally into the slots 32 so that the cable heads 21 engage the end wall. Likewise, the input connector 26 is formed from another stamped piece of sheet metal that is folded over into a shape that can be appreciated from FIG. 2. This input connector 26, similarly to output connector 30, has an end wall with a single slot (not shown) into which the cable 16 is received laterally in a similar manner as cables 18, 20.

Figure 4:
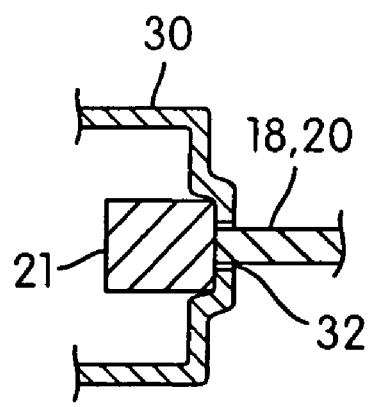
FIG. 4 is a cross-sectional view of an alternative structure for connecting the output cables to the output connector, the section being taken along the axis of one of the output cables in the lateral direction of the tensioner (i.e., the same direction as the view of FIG. 2).

FIG. 4 shows a variation for connecting the output side cables 18, 20 to the output connector 30. In this variation, a generally circular bulge is formed in the end wall of the connector 30 at the end of each slot 32. The cable heads 21 are seated in the depression formed by these bulges so that movement of the heads 21 is resisted. A similar variation can be implemented on the input side connector 26.

Moreover, the construction illustrated enables the adjuster 10 to function as an equalizer. Specifically, the output side cables 18, 20 connect at points spaced symmetrically on opposing sides of the point of the input side cable 16. This enables the tension applied to the input side cable 16 to be transferred essentially equally to the output side cables 18, 20.

However, this capability to function as an equalizer is not necessary and is only preferred.

The first part 24 includes a hub 36 with a wide diameter portion 38 and a narrow diameter portion 40. This hub 36 is mounted to the input connector 26 by a shaft 42 that extends through aligned openings on the inner portion of the input connector 26. The second part 28 has an elongated slot 44 extending along the inner portion of its output connector 30 along its longitudinal axis. The shaft 42 also extends through this slot 44 and the free end portions 45 of the sheet metal piece defining the input connector 24 are positioned on the opposing sides of the free end portions 47 of the output connector 30. The shaft 42 could be integral with the hub 36, or the shaft 42 could be formed separately and inserted into a bore in the hub 36. This construction enables the first and second parts 24, 28 to be moved generally linearly relative to one another in (1) a tensioning direction wherein the input and output connectors 26, 30 are moved relative to one another to increase the tension in the cable system 12, and (2) a releasing direction wherein the input and output connectors 26, 30 are moved relative to one another to decrease the tension in the cable system 12. Specifically, in the example illustrated, moving the first and second parts 24, 28 such that the connectors 26, 30 move towards one another increases the tension in the cable system 12, and moving the first and second parts such that the connectors 26, 30 move away from one another decreases tension in the cable system 12.

The cable tensioner 10 also comprises a cyclically operable translator 46 having a rotary input member 48 constructed to be rotatably driven by a torque applying device (not shown). The rotary input member 48 is in the form of a square-shaped lug that can be engaged and driven by a torque applying device, such as an electrically powered or pneumatic torque gun. Such a torque gun may be provided with an electronic logic based controller or an automatic shut-off valve that enables the gun to rotate its output member (and hence the input member 48) to a preset amount of torque (referred to as driving to a torque). Also, the torque gun may count the rotations of its output member with a sensor and electronic controller and rotate its output member by preset number of rotations (referred to as driving to a position). Alternatively, the torque applying device may be a manual wrench or any other type of device suitable for applying torque.

The translator 46 is operatively connected to the first and second parts 24, 28 such that rotating the rotary input member 48 cyclically moves the first and second parts 24, 28 in an alternating manner in the tensioning and releasing directions to cyclically increase and decrease the tension in the cable system 12. Specifically, the rotary input member 48 may be provided on one of the first and second parts 24, 28 and the translator 46 may further comprise a link 50 connected at one point to the rotary input member 48 and at another point to the other of the first and second parts 24, 28. In the illustrated embodiment, the rotary member 48 is provided on the end of a shaft 52 that is rotatably mounted through two aligned openings formed through the central area of the output connector 30 of the second part 28. On the opposite end of the shaft 52 is fixed a cylindrical clutch hub 54, and an eccentric cam member 56 is fixed to the clutch hub 54. A stub shaft 58 is mounted to the cam member 56 eccentrically of the rotational axis of the shaft 52 and input member 48, and one end portion of the link 50 is rotatably mounted to the stub shaft 52. The opposite end portion of the link member 50 is rotatably connected to the end of shaft 42 that extends from the hub 36 on the first part 24. By this construction, the link member 50 is connected eccentrically to the rotary input member 48 such that continuous unidirectional rotation of the rotary input member 48 causes the link 50 to cyclically move the first and second parts 24, 26 generally linearly relative to one another in the alternating manner in the tensioning and releasing directions. Of course, the construction may be reversed with the arrangement of the rotary input member 48 and its associated components being provided on the first part 24 and the shaft 42 and its associated components being provided on the second part 28. Further, any other suitable construction for affecting the translating movement between the first and second parts 24 may be used in place of the eccentrically driven link version illustrated.

It can be appreciated that the grooves shown at the ends of shafts 42, 52, and 58 are designed to receive C-shaped spring clips for securing the shafts in place, while allowing rotation of the same.

The cable tensioner 10 further comprises a one-way clutch 60 operable to allow rotation of the rotary input member 48 in a first rotational direction and prevent rotation of the rotary input member 48 in a second rotational direction. In the illustrated embodiment, the clutch 60 is a torsion spring that frictionally embraces the clutch hub 54. The spring has a free end 62 and an end 64 that is received in bracket 66, which is fixed to the second part 28 by rivets 68. The orientation of the spring windings is such that the one way clutch 60 enables the rotary input member 48 to be continuously rotated in the first rotational direction to cyclically move the first and second parts 24, 28 relative to one another in the alternating manner in the tensioning and releasing directions by the translator 46. This first direction is clockwise in the view of FIG. 1.

Specifically, when the cable system 12 is installed with the tensioner 10 in place and all the cables connected, rotating the input member in the clockwise direction will expand the spring slightly, and this action is assisted by spring end 64 engaging the bottom rivet 68 seen in FIG. 1. This drives the eccentric cam member 56 to move the link member 50 as discussed above such that the first and second parts 24, 28 move cyclically in the tensioning and releasing directions in an alternating manner. The nature of the torsion spring is such that rotating the input member 48 in the counterclockwise rotational direction tightens the frictional embrace of the spring, and hence rotation in this direction is prevented.

With the tensioner 10 installed, the tensioner 10 can be used to pre-stress the cable system by cyclically moving the input and output connectors 26, 30 in the alternating manner to cyclically-increase and decrease the tension in the cable system. By rotating the input member 48 a sufficient number of times with a torque applying device, the stress applied to the brake cable system can approximate the stress that would normally be experienced during the early life of the vehicle. This allows the conduit compression to occur in the factory prior to final release of the vehicle, rather than during the early life of the vehicle after it has been sold to an end user.

Preferably, prior to cyclically moving the input and output connectors 26, 28 in the alternating manner, the actuator 14 is left in the home or fully released position. In this case, the tensioner 10 should create enough relative movement between the input and output connectors 26, 30 that the cable travel and load experienced is greater than would normally be experienced by moving the actuator 14 to a fully applied position. For example, where the actuator 14 is designed to impart 35 mm of the cable travel during movement from the fully released to the fully applied position, the tensioner 10 may be designed to impart 45 mm of cable travel. This creates a higher tension in the cable system than would normally be experienced during normal operation of the actuator 14.

Alternatively, if the tensioner 10 is designed to create a smaller amount of relative movement, the actuator may be operated to increase the tension in the cables of the cable system to at least a level sufficient to activate the brakes 11. This increases the maximum tension applied by the eccentric action of the translator 46, as the initial tension is increased. The actuator may be further operated to increase the tension in the cables of the brake system to at least a level sufficient to fully apply the brakes prior to cyclically moving the input and output connectors 26, 30 in the alternating manner. This ensures that the tension applied by the adjuster 10 exceeds the maximum tension that would normally be used to apply the brakes experienced during vehicle operation, thus enhancing the benefits provided by this pre-stressing action. Likewise, the actuator 14 may be operated to the maximum extent possible to increase the initial tension in the cable system prior to performing the pre-stressing. Operating the actuator 14 as discussed would be done while the input and output connectors 26, 30 are as far apart as possible to maximize the tension achieved when the input and output connectors 26, 30 are brought as close together as possible by the translator 46.

However, it is preferred to design the tensioner 10 so that the actuator can be left in its fully released or home position. This avoids the need for a worker to perform the extra steps of operating the actuator. Where the actuator is hand or foot-operated, it is desirable to avoid applying and releasing the actuator 14 against cable tension, as such repetitive motions often lead to fatigue and/or injury.

The orientation of the spring windings is also such that the one-way clutch 60 enables the rotary input member 48 to be rotated in the first rotational direction to move the first and second parts 24, 28 relative to one another in the tensioning direction until reaching a desired level of tension in the cable system, and thereafter prevents the rotary input member 48 from rotating in the second rotational direction. This prevents the tension from moving the first and second parts 24, 28 relative to one another in the releasing direction.

As a result, after the cable system has been pre-stressed as discussed above, the input member 48 can be rotated in the first rotational direction (i.e., clockwise) to move the first and second parts 24, 28 and the input and output connectors 26, 30 thereon in the tensioning direction until reaching a desired level of tension. Thereafter, the one-way clutch spring will prevent the clutch hub 54, and hence the input member 48 and the cam member 56, from rotating in the second rotational direction (i.e., counterclockwise). This prevents the cable tension from moving the first and second parts 24, 28 and the input and output connectors 26, 30 thereon in the releasing direction. To accomplish this, the worker may use a torque applying device that can drive the input member 48 to a pre-set torque. As the input member 48 is being rotated such that the input and output connectors 26, 30 are being moved towards one another to increase cable tension, the torsional resistance offered by the input member 48 increases, and the torque applying device will stop rotating the input member 48 once the predetermined target torque is reached. This predetermined target torque will correspond to a desired level of tension in the cable system. Typically, this tension will be what is referred to in the art as the nominal cable tension, which is the tension that should be present when the brake actuator 14 is in its fully released position (although the device could be used to set other target tensions based on vehicle manufacturer requirements). An advantage of using such torque applying devices is that they are used throughout vehicle assembly plants and can be made readily available to the line worker responsible for pre-stressing the cable system and then setting the cable tension to a desired level. Also, this tension setting can be done later in vehicle life as part of servicing.

In place of a torsion spring clutch, a one way pawl could engage gear teeth rotatable with the input member 48 in a ratcheting manner to achieve the one-way clutching action. Further, the one-way clutch could have any other suitable construction.

Moreover, the clutching feature is optional and only preferred. The cable tension setting could be achieved in conventional ways, with the first and second parts left at their maximally spaced positions. Alternatively, the tensioner could be used as a tool on a number of different vehicles, and be replaced by an equalizer or other connection structure after using it in the pre-stressing operation on each vehicle.

In an alternative embodiment, a spring may be connected between the first and second parts 26, 28. The spring could act as a pre-tensioning spring. The spring constant would be selected so that, as slack develops, the spring will apply force to draw the parts 26, 28 toward one another for compensating for the slack.

The foregoing illustrated embodiment has been provided to illustrate the structural and functional principles of the present invention, and is not intended to be limiting. To the contrary, the present invention is intended to encompass all modifications, substitutions, alterations, and equivalents within the spirit and scope of the appended claims.

What is claimed is:

1. A brake actuating system in a motor vehicle having wheels and brakes for braking rotation of the wheels, the brake actuating system comprising:

a cable system including a plurality of cables operatively connected to the brakes of the vehicle such that increasing tension in the cables activates the brakes and then decreasing the tension in the cables deactivates the brakes;

an actuator operatively connected to the cable system, the actuator being operable by a vehicle driver to selectively increase and decrease the tension in the cables of the cable system to thereby activate and deactivate the brakes of the vehicle, respectively; and a cable tensioner mounted in the cable system and having an input connector and an output connector, the cable system including at least one input side cable operatively connecting the input connector to the actuator and at least one output side cable operatively connecting the output connector to the brakes of the vehicle;

the cable tensioner comprising:

(a) the input connector;

(b) the output connector, the input and output connectors being movable relative to one another in (1) a tensioning direction to increase the tension in the cable system, and (2) a releasing direction to decrease the tension in the cable system;

(c) a rotary input member constructed to be rotatably driven by a torque applying device, the rotary input member being operatively connected to the input and output connectors such that continuously rotating the rotary input member in one rotational direction moves the input and output connectors in an alternating manner in the tensioning and releasing directions to cyclically increase and decrease the tension in the cable system.

2. A brake actuating system in a motor vehicle having wheels and brakes for braking rotation of the wheels, the brake actuating system comprising:

a cable system including a plurality of cables operatively connected to the brakes of the vehicle such that increasing tension in the cables activates the brakes and then decreasing the tension in the cables deactivates the brakes;

an actuator operatively connected to the cable system, the actuator being operable by a vehicle driver to selectively increase and decrease the tension in the cables of the cable system to thereby activate and deactivate the brakes of the vehicle, respectively; and a cable tensioner mounted in the cable system and having an input connector and an output connector, the cable system including at least one input side cable operatively connecting the input connector to the actuator and at least one output side cable operatively connecting the output connector to the brakes of the vehicle;

the cable tensioner comprising:

(a) the input connector;

(b) the output connector, the input and output connectors being movable relative to one another in (1) a tensioning direction to increase the tension in the cable system, and (2) a releasing direction to decrease the tension in the cable system;

(c) a rotary input member constructed to be rotatably driven by a torque applying device, the rotary input member being operatively connected to the input and output connectors such that rotating the rotary input member moves the input and output connectors in an alternating manner in the tensioning and releasing directions to cyclically increase and decrease the tension in the cable system;

wherein the tensioner includes a first part carrying the input connector and a second part carrying the output connector, the first and second parts being movable generally linearly relative to one another in the tensioning and releasing directions, wherein the cable tensioner further comprises a cyclically operable translator operatively connecting the rotary input member to the first and second parts, such that rotation of the rotary input member moves the first and second parts and the input and output connectors thereon generally linearly relative to one another in the alternating manner in the tensioning and releasing directions.

3. A brake actuating system according to claim 2, wherein the rotary input member is provided on one of the first and second parts and wherein the translator further comprises a link connected at one point to the rotary input member and at another point to the other of the first and second parts, the link being connected eccentrically to the rotary input member such that continuous rotation of the rotary input member causes the link to move the first and second parts generally linearly relative to one another in the alternating manner in the tensioning and releasing directions.

4. A brake actuating system according to claim 3, wherein the cable tensioner further comprises a one-way clutch operable to allow rotation of the rotary input member in a first rotational direction and prevent rotation of the rotary input member in a second rotational direction, the one way clutch enabling the rotary input member to be continuously rotated in the first rotational direction to move the first and second parts relative to one another in the alternating manner in the tensioning and releasing directions, the one-way clutch also enabling the rotary input member to be rotated in the first rotational direction to move the first and second parts relative to one another in the tensioning direction until reaching a desired level of tension in the cable system, and thereafter preventing the rotary input member from rotating in the second rotational direction to thereby prevent the tension from moving the first and second parts relative to one another in the releasing direction.

5. A brake actuating system according to claim 2, wherein the cable tensioner further comprises a one-way clutch operable to allow rotation of the rotary input member in a first rotational direction and prevent rotation of the rotary input member in a second rotational direction, the one way clutch enabling the rotary input member to be continuously rotated in the first rotational direction to move the first and second parts relative to one another in the alternating manner in the tensioning and releasing directions, the one-way clutch also enabling the rotary input member to be rotated in the first rotational direction to move the first and second parts relative to one another until reaching a desired level of tension in the cable system, and thereafter preventing the rotary input member from rotating in the second rotational direction to thereby prevent the tension from moving the first and second parts relative to one another in the releasing direction.

6. A brake actuating system according to claim 4, wherein one-way clutch is a torsion spring frictionally embracing the rotary input member.

7. A brake actuating system according to claim 5, wherein one-way clutch is a torsion spring frictionally embracing the rotary input member.

8. A brake actuating system according to claim 2, wherein the input connector is a single input connector and at least one input side cable is a single input side cable, and wherein the output connector is a single output connector and the at least one output side cable is a pair of output side cables each operatively connected to the single output connector.

9. A method for pre-stressing a cable system of a brake actuating system in a motor vehicle having wheels and brakes for braking rotation of the wheels, the cable system including a plurality of cables operatively connected to the brakes of the vehicle such that increasing tension in the cables activates the brakes and decreasing the tension in the cables deactivates the brakes; the brake actuating system further comprising (i) an actuator operatively connected to the cable system, the actuator being operable by a vehicle driver to selectively increase and decrease the tension in the cables of the cable system to thereby activate and deactivate the brakes of the vehicle, respectively; and (ii) a cable tensioner mounted in the cable system and having an input connector, an output connector and a rotary input member; the cable system including at least one input side cable operatively connecting the input connector to the actuator and at least one output side cable operatively connecting the output connector to the brakes of the vehicle, the input and output connectors being movable relative to one another in (a) a tensioning direction to increase the tension in the cable system, and (b) a releasing direction to decrease the tension in the cable system; the rotary input member being operatively connected to the input and output connectors such that continuously rotating the rotary input member in one rotational direction moves the input and output connectors in an alternating manner in the tensioning and releasing directions; the method comprising:

continuously rotating the rotary input member in the one rotational direction with a torque applying device to move the input and output connectors of the cable tensioner in the alternating manner in the tensioning and releasing directions to cyclically increase and decrease the tension in the cable system.

10. A method according to claim 9, wherein the actuator is in a fully released position when rotating the input member to move the input and output connectors in the alternating manner.

11. A method according to claim 10, wherein movement of the input and output connectors in the tensioning direction imparts a greater amount of cable travel to the cable system than the actuator is constructed to impart during movement thereof from the fully released position to a fully applied position.

12. A method according to claim 9, further comprising:
    prior to rotating the rotary input member to move the input and output connectors of the cable tensioner in the alternating manner, operating the actuator to increase the tension in the cables of the cable system to at least a level sufficient to activate the brakes;
    wherein thereafter rotating the rotary input member to move the input and output connectors in the alternating manner cyclically increases the tension in the cable system above the level set by operating the actuator and then decreases the tension.

13. A method according to claim 12, wherein the actuator is operated to increase the tension in the cables of the brake actuating system to at least a level sufficient to fully apply the brakes prior to rotating the rotary input member to move the input and output connectors of the cable tensioner in the alternating manner.

14. A method for pre-stressing a cable system of a brake actuating system in a motor vehicle having wheels and brakes for braking rotation of the wheels, the cable system including a plurality of cables operatively connected to the brakes of the vehicle such that increasing tension in the cables activates the brakes and decreasing the tension in the cables deactivates the brakes; the brake actuating system further comprising (i) an actuator operatively connected to the cable system, the actuator being operable by a vehicle driver to selectively increase and decrease the tension in the cables of the cable system to thereby activate and deactivate the brakes of the vehicle, respectively; and (ii) a cable tensioner mounted in the cable system and having an input connector, an output connector and a rotary input member; the cable system including at least one input side cable operatively connecting the input connector to the actuator and at least one output side cable operatively connecting the output connector to the brakes of the vehicle, the input and output connectors being movable relative to one another in (a) a tensioning direction to increase the tension in the cable system, and (b) a releasing direction to decrease the tension in the cable system; the rotary input member being operatively connected to the input and output connectors such that rotating the rotary input member moves the input and output connectors in an alternating manner in the tensioning and releasing directions; the method comprising:

rotating the rotary input member with a torque applying device to move the input and output connectors of the cable tensioner in the alternating manner in the tensioning and releasing directions to cyclically increase and decrease the tension in the cable system;

wherein the cable tensioner comprises: (a) a first part carrying the input connector, (b) a second part carrying the output connector, the first and second parts being movable generally linearly relative to one another in the tensioning and releasing directions, and (c) a cyclically operable translator operatively connecting the rotary input member to the first and second parts such that rotating the rotary input member moves the first and second parts and the input and output connectors thereon in the alternating manner in the tensioning and releasing directions, wherein rotating the rotary input member with the torque applying device causes the translator to move the first and second parts and the input and output connectors thereon in the alternating manner in the tensioning and releasing directions.

15. A method according to claim 14, wherein the cable tensioner further comprises a one-way clutch operable to allow rotation of the rotary input member in a first rotational direction and to prevent rotation of the rotary input member in a second rotational direction, wherein the rotary input member is rotated continuously in the first rotational direction by the torque applying device to move the first and second parts and the input and output connectors thereon in the alternating manner in the tensioning and releasing directions;

the method further comprising:
    after rotating the rotary input member to move the first and second parts and the input and output connectors thereon in the tensioning and releasing directions, rotating the rotary input member in the first rotational direction to move the first and second parts and the input and output connectors thereon in the tensioning direction until reaching a desired level of tension in the cable system, the one-way clutch thereafter preventing the rotary input member from rotating in the second rotational direction so as to prevent the tension from moving the first and second parts and the input and output connectors thereon in the releasing direction.

16. A method according to claim 15, wherein the one-way clutch is a torsion spring frictionally embracing the rotary input member.

17. A method for pre-stressing a cable system of a brake actuating system in a motor vehicle having wheels and brakes for braking rotation of the wheels, the cable system including a plurality of cables operatively connected to the brakes of the vehicle such that increasing tension in the cables activates the brakes and decreasing the tension in the cables deactivates the brakes; the brake actuating system further comprising (i) an actuator operatively connected to the cable system, the actuator being operable by a vehicle driver to selectively increase and decrease the tension in the cables of the cable system to thereby activate and deactivate the brakes of the vehicle, respectively; and (ii) a cable tensioner mounted in the cable system and having an input connector, an output connector and a rotary input member; the cable system including at least one input side cable operatively connecting the input connector to the actuator and at least one output side cable operatively connecting the output connector to the brakes of the vehicle, the input and output connectors being movable relative to one another in (a) a tensioning direction to increase the tension in the cable system, and (b) a releasing direction to decrease the tension in the cable system; the rotary input member being operatively connected to the input and output connectors such that rotating the rotary input member moves the input and output connectors in an alternating manner in the tensioning and releasing directions; the method comprising:

rotating the rotary input member with a torque applying device to move the input and output connectors of the cable tensioner in the alternating manner in the tensioning and releasing directions to cyclically increase and decrease the tension in the cable system;

wherein the actuator is in a fully released position when rotating the input member to move the input and output connectors in the alternating manner;

wherein the cable tensioner comprises: (a) a first part carrying the input connector, (b) a second part carrying the output connector, the first and second parts being movable generally linearly relative to one another in the tensioning and releasing directions, and (c) a cyclically operable translator operatively connecting the rotary input member to the first and second parts such that rotating the rotary input member moves the first and second parts and the input and output connectors thereon in the alternating manner in the tensioning and releasing directions, wherein rotating the rotary input member with the torque applying device causes the translator to move the first and second parts and the input and output connectors thereon in the alternating manner in the tensioning and releasing directions.

18. A method according to claim 17, wherein the cable tensioner further comprises a one-way clutch operable to allow rotation of the rotary input member in a first rotational direction and to prevent rotation of the rotary input member in a second rotational direction, wherein the rotary input member is rotated continuously in the first rotational direction by the torque applying device to move the first and second parts and the input and output connectors thereon in the alternating manner in the tensioning and releasing directions;

the method further comprising:

after rotating the rotary input member to move the first and second parts in the tensioning and releasing directions, rotating the rotary input member in the first rotational direction to move the first and second parts and the input and output connectors thereon in the tensioning direction until reaching a desired level of tension in the cable system, the one-way clutch thereafter preventing the rotary input member from rotating in the second rotational direction so as to prevent the tension from moving the first and second parts and the input and output connectors thereon in the releasing direction.

19. A method according to claim 18, wherein the one-way clutch is a torsion spring frictionally embracing the rotary input member.

20. A method for pre-stressing a cable system of a brake actuating system in a motor vehicle having wheels and brakes for braking rotation of the wheels, the cable system including a plurality of cables operatively connected to the brakes of the vehicle such that increasing tension in the cables activates the brakes and decreasing the tension in the cables deactivates the brakes; the brake actuating system further comprising (i) an actuator operatively connected to the cable system, the actuator being operable by a vehicle driver to selectively increase and decrease the tension in the cables of the cable system to thereby activate and deactivate the brakes of the vehicle, respectively; and (ii) a cable tensioner mounted in the cable system and having an input connector, an output connector and a rotary input member; the cable system including at least one input side cable operatively connecting the input connector to the actuator and at least one output side cable operatively connecting the output connector to the brakes of the vehicle, the input and output connectors being movable relative to one another in (a) a tensioning direction to increase the tension in the cable system, and (b) a releasing direction to decrease the tension in the cable system; the rotary input member being operatively connected to the input and output connectors such that rotating the rotary input member moves the input and output connectors in an alternating manner in the tensioning and releasing directions; the method comprising:

rotating the rotary input member with a torque applying device to move the input and output connectors of the cable tensioner in the alternating manner in the tensioning and releasing directions to cyclically increase and decrease the tension in the cable system;

wherein the actuator is in a fully released position when rotating the input member to move the input and output connectors in the alternating manner;

wherein movement of the input and output connectors in the tensioning direction imparts a greater amount of cable travel to the cable system than the actuator is constructed to impart during movement thereof from the fully released position to a fully applied position;

wherein the cable tensioner comprises: (a) a first part carrying the input connector, (b) a second part carrying the output connector, the first and second parts being movable generally linearly relative to one another in the tensioning and releasing directions, and (c) a cyclically operable translator operatively connecting the rotary input member to the first and second parts such that rotating the rotary input member moves the first and second parts and the input and output connectors thereon in the alternating manner in the tensioning and releasing directions, wherein rotating the rotary input member with the torque applying device causes the translator to move the first and second parts and the input and output connectors thereon in the alternating manner in the tensioning and releasing directions.

21. A method according to claim 20, wherein the cable tensioner further comprises a one-way clutch operable to allow rotation of the rotary input member in a first rotational direction and to prevent rotation of the rotary input member in a second rotational direction,
   wherein the rotary input member is rotated continuously in the first rotational direction by the torque applying device to move the first and second parts and the input and output connectors thereon in the alternating manner in the tensioning and releasing directions;
   the method further comprising:
      after rotating the rotary input member to move the first and second parts in the tensioning and releasing directions, rotating the rotary input member in the first rotational direction to move the first and second parts and the input and output connectors thereon in the tensioning direction until reaching a desired level of tension in the cable system, the one-way clutch thereafter preventing the rotary input member from rotating in the second rotational direction so as to prevent the tension from moving the first and second parts and the input and output connectors thereon in the releasing direction.

22. A method according to claim 21, wherein the one-way clutch is a torsion spring frictionally embracing the rotary input member.

23. A cable tensioner for use in a brake actuating system in a motor vehicle having wheels and brakes for braking rotation of the wheels, the brake actuating system comprising: a cable system including a plurality of cables operatively connected to the brakes of the vehicle such that increasing tension in the cables activates the brakes and decreasing the tension in the cables deactivates the brakes, and an actuator operatively connected to the cable system, the actuator being operable by a vehicle driver to selectively increase and decrease the tension in the cables of the cable system to thereby activate and deactivate the brakes of the vehicle, respectively, the cable system including at least one input side cable operatively connected to the actuator and at least one output side cable operatively connected to brakes of the vehicle; the cable tensioner comprising:
   an input connector constructed to be operatively connected to the at least one input side cable of the cable system;
   an output connector constructed to be operatively connected to the at least one output side cable of the cable system, the input and output connectors being movable relative to one another in (1) a tensioning direction to increase the tension in the cable system, when the input and output connectors are operatively connected to the at least one input side cable and the at least one output side cable of the cable system, and (2) a releasing direction to decrease the tension in the cable system, when the input and output connectors are operatively connected to the at least one input side cable and the at least one output side cable of the cable system; and
   a rotary input member constructed to be rotatably driven by a torque applying device, the rotary input member being operatively connected to the input and output connectors such that, when the input and output connectors are operatively connected to the at least one input side cable and the at least one output side cable of the cable system, continuously rotating the rotary input member in one rotational direction moves the input and output connectors in an alternating manner in the tensioning and releasing directions to cyclically increase and decrease the tension in the cable system.

24. A cable tensioner for use in a brake actuating system in a motor vehicle having wheels and brakes for braking rotation of the wheels, the brake actuating system comprising: a cable system including a plurality of cables operatively connected to the brakes of the vehicle such that increasing tension in the cables activates the brakes and decreasing the tension in the cables deactivates the brakes, and an actuator operatively connected to the cable system the actuator being operable by a vehicle driver to selectively increase and decrease the tension in the cables of the cable system to thereby activate and deactivate the brakes of the vehicle, respectively, the cable system including at least one input side cable operatively connected to the actuator and at least one output side cable operatively connected to brakes of the vehicle; the cable tensioner comprising:
   an input connector constructed to be operatively connected to the at least one input side cable of the cable system;
   an output connector constructed to be operatively connected to the at least one output side cable of the cable system, the input and output connectors being movable relative to one another in (1) a tensioning direction to increase the tension in the cable system, when the input and output connectors are operatively connected to the at least one input side cable and the at least one output side cable of the cable system, and (2) a releasing direction to decrease the tension in the cable system, when the input and output connectors are operatively connected to the at least one input side cable and the at least one output side cable of the cable system; and
   a rotary input member constructed to be rotatably driven by a torque applying device, the rotary input member being operatively connected to the input and output connectors such that, when the input and output connectors are operatively connected to the at least one input side cable and the at least one output side cable of the cable system, rotating the rotary input member moves the input and output connectors in an alternating manner in the tensioning and releasing directions to cyclically increase and decrease the tension in the cable system;
   a first part carrying the input connector and a second part carrying an output connector, the first and second parts being movable generally linearly relative to one another, and
   a cyclically operable translator operatively connecting the rotary input member to the first and second parts such that rotation of the rotary input member moves the first and second parts and the input and output connectors thereon generally linearly relative to one another in the alternating manner in the tensioning and releasing directions.

25. A cable tensioner according to claim 24, wherein the rotary input member is provided on one of the first and second parts and wherein the translator further comprises a link connected at one point to the rotary input member and at another point to the other of the first and second parts, the link being connected eccentrically to the rotary input member such that continuous unidirectional rotation of the rotary input member causes the link to move the first and second parts generally linearly relative to one another in the alternating manner in the tensioning and releasing directions.

26. A cable tensioner according to claim 25, further comprising a one-way clutch operable to allow rotation of the rotary input member in a first rotational direction and prevent rotation of the rotary input member in a second rotational direction,
   the one way clutch enabling the rotary input member to be continuously rotated in the first rotational direction to move the first and second parts relative to one another in the alternating manner in the tensioning and releasing directions, the one-way clutch also enabling the rotary input member to be rotated in the first rotational direction to move the first and second parts relative to one another in the tensioning direction until reaching a desired level of tension in the cable system when the input and output connectors are operatively connected to the at least one input side cable and the at least one output side cable of the cable system, and thereafter preventing the rotary input member from rotating in the second rotational direction to thereby prevent the tension from moving the first and second parts relative to one another in the releasing direction.

27. A cable tensioner according to claim 24, further comprising a one-way clutch operable to allow rotation of the rotary input member in a first rotational direction and prevent rotation of the rotary input member in a second rotational direction, the one way clutch enabling the rotary input member to be continuously rotated in the first rotational direction to move the first and second parts relative to one another in the alternating manner in the tensioning and releasing directions, the one-way clutch also enabling the rotary input member to be rotated in the first rotational direction to move the first and second parts relative to one another in the tensioning direction until reaching a desired level of tension in the cable system when the input and output connectors are operatively connected to the at least one input side cable and the at least one output side cable of the cable system, and thereafter preventing the rotary input member from rotating in the second rotational direction to thereby prevent the tension from moving the first and second parts relative to one another in the releasing direction.

28. A cable tensioner according to claim 26, wherein one-way clutch is a torsion spring frictionally embracing the rotary input member.

29. A cable tensioner according to claim 27, wherein one-way clutch is a torsion spring frictionally embracing the rotary input member.

30. A cable tensioner according to claim 25, wherein the input connector is a single input connector for operative connection to a single input side cable, and wherein the output connector is a single output connector for operative connection to a pair of output side cables.

* * * * *